INVENTOR.
OTTO M. WITTNER.

United States Patent Office

3,328,021
Patented June 27, 1967

3,328,021
WELDING AID
Otto M. Wittner, Groves, Tex., assignor to Gulf Oil Corporation, Pittsburgh, Pa., a corporation of Pennsylvania
Filed Dec. 24, 1964, Ser. No. 421,047
8 Claims. (Cl. 269—1)

This invention relates to apparatus suitable for facilitating welding of two bodies to each other.

In welding one large metal plate to another, as in lapped joints, it frequently occurs that the edges of the plates to be welded to each other are not in continuous contact with each other, because, for example, the surfaces thereof may be uneven or one or the other or both of the two plates may be bent. In making a proper weld it is imperative, of course, that the edges of the plates be close together, and for such reason therefore it is exceedingly difficult to obtain a proper weld when the edges of the plates to be welded to each other are not in continuous contact with each other. The apparatus of this invention facilitates the welding of two metal plates to each other and overcomes the difficulties described above.

Figure 1:
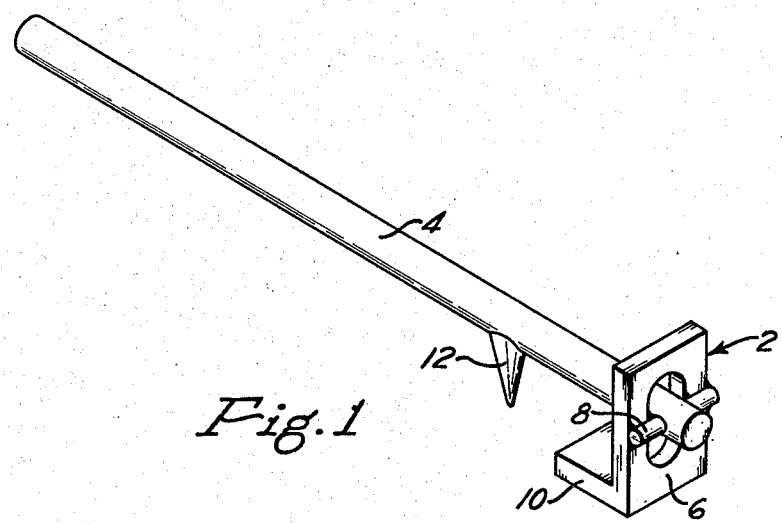
Figure 2:
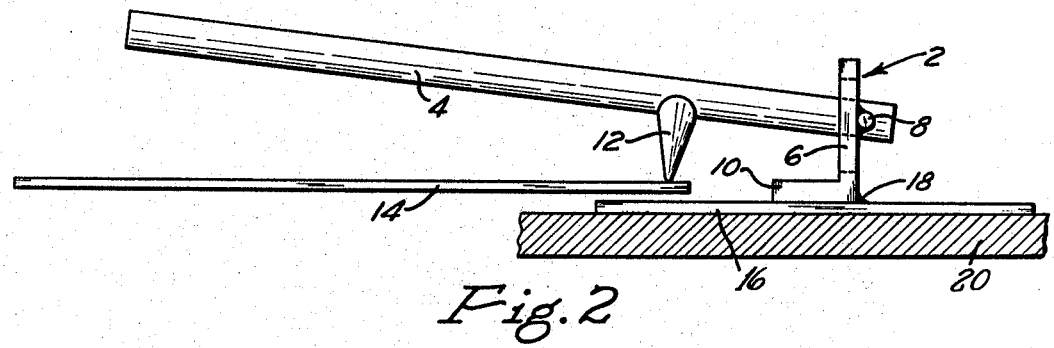

The apparatus of this invention can further be illustrated by reference to the accompanying drawing wherein FIGURE 1 is a perspective view thereof and FIGURE 2 is a view of the apparatus in operation.

Referring to FIGURE 1, reference numeral 2 defines a metal bracket to which there is pivotally mounted, in any suitable manner, a metal lever or bar 4 which can assume any desired cross section from circular to rectangular. In the preferred embodiment illustrated in FIGURE 1, metal bracket 2 is provided with an opening 6 wherein therein is fixedly mounted in any suitable manner, for example by welding, a pin 8, upon which lever 4 is pivotally mounted. Preferably, bracket 2 is provided, integral therewith and preferably facing generally in the direction of lever 4, with a base portion 10. If desired base portion 10 can also extend outwardly in a direction generally opposite to the direction of lever 4. On the underside of lever 4 and integral therewith, preferably at a point on the underside of the lever between the midpoint thereof and the end thereof adjacent bracket 2, there is provided an abutment or shoe 12.

A typical operation showing the use of the apparatus described and claimed herein is illustrated in FIGURE 2. Reference numerals 14 and 16 represent two plates having irregular surfaces, for example, that are to be joined together by means of a lap weld. Numeral 20 designates a solid supporting surface for the plates 14 and 16. Initially the apparatus of this invention is securely mounted on plate 16, for example, by means of a tack weld 18. Base portion 10 of bracket 2 has a relatively large surface area on the underside thereof and helps to maintain bracket 2 in place on plate 16. In addition, since base portion 10 extends generally in the direction of lever 4 it also helps to prevent bracket 2 from pivotting about tack weld 18. After the device has been attached to plate 16, as defined above, force is brought to bear downwardly on lever 4 adjacent the end thereof remote from bracket 2. As lever 4 pivots around pin 8 abutment or shoe 12 bears down on the free end of plate 14 overlying the adjacent free end of plate 16, and the adjacent surfaces of the plates are thereby easily brought into continuous contact with each other so that a proper weld can be obtained. In order to obtain effective contact between shoe 12 and the adjacent plate under all circumstances, shoe 12 is preferably in the form of a cone, with its free end being the apex thereof.

Upon completion of the desired weld between the two plates, the device of this invention is removed from plate 16. The embodiment illustrated in the drawing is removed merely by lifting lever 4 upwardly at the free end thereof until contact is made between lever 4 and the upper edge of opening 6. Further movement upwardly of the lever forces bracket 2 over and easily breaks tack weld 18, which has little resistance to the bending stress. The apparatus is then available for reuse as before.

Obviously, many modifications and variations of the invention, as hereinabove set forth, can be made without departing from the spirit and scope thereof, and therefore only such limitations should be made as are indicated in the appended claims.

I claim:
1. An apparatus for facilitating the welding of a pair of articles together comprising:
   a bracket member, said bracket member comprising an integral base plate portion and a support portion extending substantially perpendicularly away from one end of said base plate portion,
   a lever member,
   means to pivot said lever member to said support portion in spaced relation to said base plate portion,
   means to restrain said lever member from pivoting through an arc greater than 90°,
   said lever member comprising an elongated handle portion extending generally parallel to said articles when in hold down relation thereto, and
   said lever member comprising a rigid hold down member to hold said articles together to facilitate the welding thereof.

2. An apparatus according to claim 1 wherein said support portion is formed with an opening, said pivot means comprising a pivot pin joined to said support portion across said opening and on the side of said support portion opposite said hold down member and extending through an opening formed in said lever member, and said restraining means comprising the portion of said support portion adjacent said opening on the side thereof opposite said base plate portion.

3. An apparatus suitable for facilitating the welding of a pair of articles together comprising:
   a bracket member, said bracket member comprising:
      a base plate portion adapted to be fixed to one of said articles; and a support portion extending substantially perpendicularly away from said base plate portion and integral with said base plate portion;
   a lever member extending generally in the direction of said base plate portion;
   said support portion being formed with an aperture therein to receive one end of said lever member;
   pivot means pivotally joining said one end of said lever member to said support portion;
   whereby said lever member is restrained from pivoting through an arc greater than 90° by abutting cooperation between said lever member and said support portion;
   said lever member comprising an elongated handle portion;
   and a rigid hold down member fixedly attached to said handle portion;
   said rigid hold down member being attached substantially perpendicularly to said handle portion on the side thereof facing said articles;
   and said hold down member being adapted to contact and press one of said articles against the other article when the apparatus is in hold down relation to said articles.

4. An apparatus according to claim 3 wherein said hold down member is integral with said handle.

5. An apparatus according to claim 3 wherein said pivot means comprise a pin, said pin being fixedly attached to the opposite side of said support portion from said rigid hold down member, and said one end of said lever member passing through said aperture in said support member being formed with an opening pivotally receiving said pin.

6. An apparatus according to claim 5 wherein said hold down member is in the form of a cone with its free end being the apex thereof.

7. An apparatus according to claim 6, said cone being formed integral with said lever member and having a length equal to at least the distance between said lever member and the surface of said base plate portion in contact with said one of said articles when said base plate portion and said lever member are in substantially parallel relation to each other.

8. An apparatus in accordance with claim 3 wherein said pivot means are positioned in line with the jointure point of said base plate portion and said one of said articles along the side of said support portion opposite said hold down member.

References Cited
UNITED STATES PATENTS

| | | | |
|---|---|---|---|
| 1,474,227 | 11/1923 | Boisset | 29—267 |
| 1,630,942 | 5/1927 | Hughes | 29—267 |
| 2,779,090 | 1/1957 | Johnson | 29—267 |

RICHARD H. EANES, JR., *Primary Examiner.*